Dec. 2, 1958          J. A. MILLER          2,862,403
TRANSMISSION
Filed Jan. 25, 1954
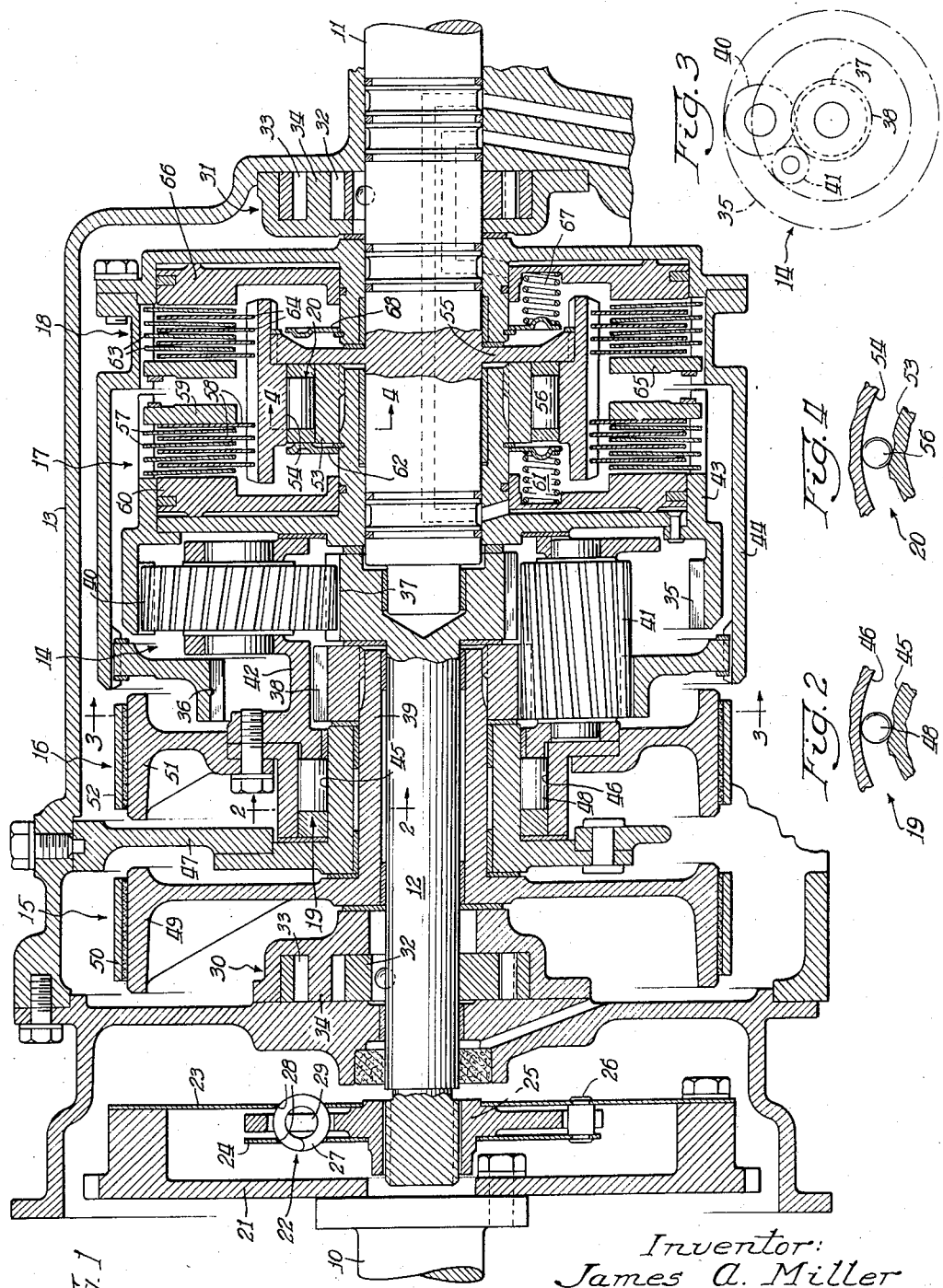
Inventor:
James A. Miller
By Keith J. Bleuer
Atty.

United States Patent Office 2,862,403
Patented Dec. 2, 1958

2,862,403

TRANSMISSION

James A. Miller, Grosse Pointe Park, Mich., assignor to Borg-Warner Corporation, Chicago, Ill., a corporation of Illinois Application January 25, 1954, Serial No. 405,833

8 Claims. (Cl. 74—763)

My invention relates to transmissions and more particularly to transmissions suitable for automotive vehicles.

It is an object of the invention to provide an improved transmission having four speeds in forward drive and one speed in reverse drive, all speeds being completed by engagement of friction engaging mechanisms, so that changing between the various ratios may be accomplished without interruption of torque from the driving engine of the vehicle.

It is another object of the invention to so arrange the transmission that various of the lower speed forward drive power trains are also completed by one-way engaging devices which automatically disengage on a subsequent completion of a higher speed power train by engagement of the friction engaging device for the higher speed power train.

It is a further object of the invention to provide such a transmission in which only four friction engaging mechanisms are required for completing the four speeds in forward drive and one speed in reverse drive.

It is also an object to provide such a transmission comprising a planetary gear set with the transmission being advantageously compact for ready installation in a vehicle.

It is also an object of the invention to provide such an improved transmission having means for locking up the various one-way engaging devices, so that the various power trains completed by the one-way engaging devices may be rendered operative for a drive from the driven shaft to the drive shaft of the transmission, as well as from the drive shaft to the driven shaft. It is contemplated that various of the four friction mechanisms previously mentioned shall be effective for providing these two-way drives and that they shall also be effective for completing a reverse drive power train.

An additional object is to provide an improved transmission adapted for automatic operation which is of a small compact size to fit in relatively small size vehicles, and which supplies four ratios in forward drive that are spread over a relatively wide ratio range so as to make the transmission particularly adaptable for vehicles with low powered engines.

The invention consists of the novel constructions, arrangements and devices to be hereinafter described and claimed for carrying out the above stated objects and such other objects as will appear from the following description of a preferred embodiment, illustrated with reference to the accompanying drawing, wherein:

Fig. 1 is a longitudinally sectional view of a transmission embodying the principles of the invention; and Figs. 2, 3 and 4 are sectional views taken respectively on lines 2—2, 3—3, and 4—4 of Fig. 1 in the directions indicated with Fig. 3 being taken on a smaller size scale.

Like characters of reference designate like parts in several views.

Referring now in particular to Fig. 1 of the drawing, the illustrated transmission comprises, in general, a drive shaft 10, a driven shaft 11, and an intermediate shaft 12. The shaft 10 is adapted to be connected to the engine of the vehicle in which the transmission is installed, and the shaft 11 is adapted to be connected to the driving road wheels of the vehicle by means of any suitable connecting mechanism (not shown). The shaft 11 is piloted in the shaft 12, and all of these shafts are coaxially disposed. The shafts 11 and 12 are journaled within the transmission casing 13, as shown. The transmission also comprises a planetary gear set 14, friction brakes 15 and 16, friction clutches 17 and 18, a one-way brake 19 and a one-way clutch 20.

The intermediate shaft 12 is driven from the drive shaft 10 through a fly wheel 21 and a vibration dampener 22. The vibration dampener 22 is of a usual construction and comprises a circular plate 23 bolted to the flywheel 21 and a circular plate 24. The plates 23 and 24 are disposed on opposite sides of an annular hub 25, which is splined to the intermediate shaft 12, and are held in position with respect to each other by rivets 26. Also encased between the plates 23 and 24 are a plurality of springs 27 which are disposed in windows 28 of the plates 23 and 24 and in windows 29 in the hub 25. It must be pointed out, however, that a hydraulic torque convertor or hydraulic coupling of ordinary construction may be used instead of a spring dampener.

A pump 30 driven by the shaft 12 and a pump 31 driven by the shaft 11 are provided and are of ordinary construction of a type commonly used. Each of the pumps has an inner gear 32 fixed to its respective shaft, and the gear 32 is in mesh with an outer gear 33. A segmental casing portion 34 is located between the gears 32 and 33, and pumping action is obtained by fluid being carried by the gears across the segmental casing portion. These pumps may be utilized to provide fluid pressure for engaging the friction brakes 15 and 16, and the clutches 17 and 18 and to provide lubrication for the entire transmission and any necessary cooling oil for the friction clutches and brakes.

The planetary gear set 14 comprises ring gears 35 and 36 rotatably supported on the driven shaft 11, a sun gear 37 which is connected and formed integrally with the intermediate shaft 12, a sun gear 38 splined to a sleeve portion 39 supported on the intermediate shaft 12, planet gears 40 (one being shown in the drawing) in mesh with the sun gear 37 and the ring gear 35, and elongated planet gears 41 (one being shown in the drawing) each in mesh with the sun gear 38, ring gear 36, and the planet gears 40. A planet gear carrier 42 rotatably supports the planet gears 40 and 41. This planetary gear set is encased in an inner shell portion 43, which is formed integrally with the ring gear 35, and an outer shell portion 44 which is connected to the ring gear 36.

The one-way brake 19 is of an ordinary type having inner and outer race members 45 and 46. The inner race member 45 that journals the sleeve portion 39 has cam surfaces and is connected to an annular part 47 which is fixed to the transmission casing 13, and the outer race member 46 has a cylindrical surface and is connected to the planet gear carrier 42. These opposite race members 45 and 46 have a plurality of rollers 48 disposed between them, which cooperate with the cam and cylindrical surfaces with a wedging action that locks the races together to prevent reverse rotation of the outer member 46 with respect to the inner member 45.

The friction brake 15 is provided for the sun gear 38 and comprises a brake drum 49 formed integrally with the sleeve portion 39, that is journaled within the inner race member 45, and a brake band 50 adapted to contact the drum. The friction brake 16 is provided for the planet gear carrier 42 and comprises a drum portion 51 fixed to the carrier 42 and a brake band 52 adapted to contact and grip the brake drum 51.

The one-way clutch 20 comprises inner and outer race members 53 and 54. The inner race members 53 has cam surfaces and is splined on the shell portion 43, which is integrally formed with the ring gear 35, and the outer race member 54 has an inner cylindrical surface and is splined to a hub portion 55 which is integrally formed on the driven shaft 11. These race members 53 and 54 have a plurality of rollers 56 disposed between them, which cooperate with the cam and cylindrical surfaces with a wedging action to provide a drive in the forward direction from the inner race member 53 to the outer race member 54.

The friction clutch 17 comprises clutch plates 57 which are splined to the inner shell portion 43 and clutch plates 58 which are splined to the outer race member 54 of the one-way clutch 20. The clutch plates 57 and 58 are interleaved between a backing plate 59 secured to the shell 43 and an annular piston 60 movable in the shell 43. Fluid may be applied to the piston 60 through any suitable passages to cause the clutch plates 57 and 58 to frictionally engage. Springs 61 fitted into an annular spring retainer 62 fixed with respect to the shell 43 act on the piston 60 to return the piston to clutch disengaging position.

The friction clutch 18 comprises clutch plates 63 which are splined to the outer shell portion 44 and clutch plates 64 which are splined to the outer race member 54 of the one-way clutch 20. The clutch plates 63 and 64 are interleaved between a backing plate 65, secured to the shell 44 and an annular piston 66 movable in the shell 44. Fluid may be applied to the piston 66 through any suitable passages to cause the clutch plates 63 and 64 to frictionally engage. Springs 67 fitted into an annular spring retainer 68 fixed with respect to the shell 44 act on the piston 66 to return the piston to clutch disengaging position.

The illustrated transmission provides four speed ratios in forward drive and one speed ratio in reverse drive, the two lower forward speed ratios being one-way drives, and the transmission also provides a first speed two-way forward drive and a second speed two-way forward drive.

The first speed forward drive for the transmission is obtained by applying the friction brake 15 which is effective on the sun gear 38 to hold it stationary. The drive is from the drive shaft 10 through the fly wheel 22, the vibration dampener 21, the shaft 12, the sun gear 37, the planet gears 40, the ring gear 35, the shell 43 fixed with respect to the ring gear, the one-way clutch 20, the annular hub portion 55 to the driven shaft 11. The reaction of the planetary gearing is taken by the brake 15 functioning through the sun gear 38, the planet gears 41 and the planet gears 40.

The drive in second speed forward ratio is subsequently obtained by disengaging the friction brake 15 and engaging the friction clutch 18. Engagement of the clutch 18 is obtained by applying fluid under pressure to the piston 66, thereby frictionally engaging the plates 63 and 64 with each other between the piston and the backing plate 65. The power train is from the sun gear 37 driven by the shafts 10 and 12, through the planet gears 40 and 41, the ring gear 36, the shell 44, the clutch 18 and the flange hub portion 55 to the driven shaft 11. The reaction of the planetary gear set in this case is taken by the one-way brake 19 functioning to hold the planet gear carrier 42 against reverse rotation.

A drive in third speed forward ratio is obtained by engaging the friction brake 15 and allowing the friction clutch 18 to remain engaged. This completes a power train from the intermediate shaft 12 through the sun gear 37, the planet gears 40, the planet gears 41, the ring gear 36, the shell 44, the clutch 18 and the hub portion 55 to the driven shaft 11. The reaction of the planetary gear set 14 is taken by the friction brake 15 holding the sun gear 38 stationary which results in the carrier 42 rotating in the forward direction so as to cause the one-way brake 19 to disengage. The friction clutch may be engaged by application of fluid pressure. It is apparent that this power train is completed simply by the engagement of the single friction brake 15, and that the second speed power train is automatically broken by the one-way device 19.

The drive in four speed forward ratio is obtained by disengaging the friction brake 15 and engaging the friction clutch 17 and allowing the friction clutch 18 to remain in engagement. Under this arrangement, the planetary gear set 14 is locked up, and the drive from the intermediate shaft 12 proceeds through the sun gear 37, the planet gears 40 and 41, the ring gears 35 and 36, and clutches 17 and 18 to the driven shaft 11.

In the first speed two-way drive, the friction brake 15 is engaged, as is the case for the first speed one-way drive previously described. For the two-way drive, the friction clutch 17 is also engaged, and since this is in parallel with the one-way clutch 20, the one-way clutch 20 is locked up, and the two-way drive exists. The first speed two-way drive proceeds through the same elements as the one-way drive previously described, except that the drive is through the friction clutch 17 instead of the one-way clutch 20.

In the second speed two-way drive, the friction clutch 18 is engaged, as is the case in the second speed one-way drive previously described, and the brake 16 is also engaged. The brake 16 is in parallel with the one-way brake 19 and locks up the brake 19 to provide the two-way drive.

In order to obtain reverse drive, the friction brake 16 is engaged along with the friction clutch 17. The drive proceeds from the intermediate shaft 12 through the sun gear 37, the planet gears 40, the ring gear 35 and the friction clutch 17 to the outer race member 54 and the hub portion 55 to the driven shaft 11. The friction brake 16 takes the reaction of the planetary gear set, holding the carrier 42 stationary.

The transmission advantageously utilized a planetary gear set and is quite compact. Four speed ratios in forward drive, including two which are one-way drives and may be locked up to become two-way drives, and a reverse drive are provided by the transmission with the use of only four friction engaging devices. No positive engaging devices are utilized, and the power trains are all completed by friction engaging devices, so that the transmission may be power shifted from one speed ratio to another without any interruption of torque of the driving engine.

The transmission is so arranged that, in changing sequentially from first to second, then second to third, and finally from third to fourth, one of these ratio changes may be made simply by an engagement of one of the friction devices and the other two ratio changes may be made simply by disengaging one of the friction devices, and at the same time engaging one of the other friction devices, the latter shifts being so called single overlap shifts.

I wish to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission; the combination of a drive shaft; a driven shaft; a planetary gear set having a sun gear connected and driven by said drive shaft, a first and second ring gear rotatably supported on said driven shaft, a second sun gear rotatably supported on said drive shaft, a set of planet gears and a set of elongated planet gears intermesh with one another, as well as in mesh with their respective first and second mentioned ring and sun gears and a planet gear carrier rotatably supporting the two sets of planet gears; clutch means for connecting each of the two ring gears with the driven shaft; a one-way clutch connected in parallel with one of said clutch means; brake means for both the second sun gear and the carrier; a one-way brake connected in parallel with one of said brake means; said clutch means and said brake means being engageable in different pairs for completing four different ratio power trains from said drive shaft to said driven shaft.

2. In a transmission; the combination of a drive shaft; a sleeve portion rotatably disposed on the drive shaft; a driven shaft; a planetary gear set comprising a first and second ring gear each of which is rotatably supported on the driven shaft, a pair of sun gears one of which is connected to and driven by the drive shaft, and the other of which is connected to the sleeve portion supported on the drive shaft, a set of planetary gears intermeshed with a set of elongated planetary gears, said sets of planetary gears in addition being in mesh with their respective first and second mentioned ring and sun gears, a planet gear carrier for rotatably supporting all of said planet gears, said planetary gear set being partially enclosed by an inner shell portion which is formed integrally with the first mentioned ring gear and an outer shell portion which is formed integrally with the second mentioned ring gear; a clutch means for connecting each of the two ring gears with the driven shaft; a one-way clutch connected in parallel with one of said clutch means; brake means for both the second sun gear and the carrier; and a one-way brake connected in parallel with one of the said brake means; said clutch means and said brake means being engageable in different pairs for completing four different speeds in forward drive and one speed in reverse drive from said drive shaft to said driven shaft.

3. In a transmission, the combination of a drive shaft, a driven shaft, a planetary gear set having an input element and two output elements and two reaction elements, said input element being connected to said drive shaft, a brake for each of said two reaction elements, a first clutch for connecting a first one of said output elements with said driven shaft, a second clutch being engageable either alone or simultaneously with said first clutch; for connecting the second one of said output elements with said driven shaft, a first operator for engaging said first clutch when fluid pressure is applied to said first operator and a second operator for engaging said second clutch when fluid pressure is applied to the said second operator, said first and second clutches for the two output elements and said two brakes for the two reaction elements being engageable in different pairs for completing four different ratio power trains in forward speed; from said drive shaft to said driven shaft.

4. In a transmission the combination of a drive shaft, a driven shaft, a planetary gear set having an input element and two output elements and two reaction elements, said input element being connected to said drive shaft, a brake for each of said two reaction elements, a first clutch for connecting a first one of said output elements with said driven shaft, a second clutch for connecting the second one of said output elements with said driven shaft, a first piston for engaging said first clutch when fluid pressure is applied to the first piston, a second piston for engaging said second clutch when fluid pressure is applied to the second piston and a one-way clutch connected in parallel with one of said clutches, said first and second clutches for the two output elements and said two brakes for the two reaction elements being engageable in different pairs for completing four different ratio power trains from said drive shaft to said driven shaft.

5. In a transmission the combination of a drive shaft, a driven shaft, a planetary gear set having an input element and two output elements and two reaction elements, said input element being connected to said drive shaft, a friction brake for each of said two reaction elements, a first friction clutch for connecting the first one of said output elements with said driven shaft, a second friction clutch for connecting the second one of said output elements with said driven shaft, a first piston for engaging said first friction clutch when fluid pressure is applied to the first piston, a second piston for engaging said second friction clutch with fluid pressure is applied to the second piston and a one-way clutch connected in parallel with one of said friction clutches, said first and second friction clutches for the two output elements and said two friction brakes for the two reaction elements being engageable in different pairs for completing four different ratio power trains from said drive shaft to said driven shaft.

6. In a transmission; a combination of a drive shaft; a driven shaft; a planetary gear set having a sun gear connected with and driven by said drive shaft, a first and second ring gear and two reaction elements including a second sun gear and a planet gear carrier; a brake for each of said two reaction elements; a first clutch for connecting said first ring gear with said driven shaft and a second clutch being engageable either alone or simultaneously with said first clutch; for connecting said second ring gear with said driven shaft; a first piston for engaging said first clutch when fluid pressure is applied to the first piston and a second piston for engaging said second clutch when the fluid pressure is applied to the second piston; said clutches for said ring gears and said brakes for said reaction elements being engageable in different pairs for completing four different ratio power trains in forward speed; from said drive shaft to said driven shaft.

7. In a transmission; a combination of a drive shaft; a driven shaft; a planetary gear set having a sun gear connected with and driven by said drive shaft, a first and second ring gear and two reaction elements including a second sun gear and a planet gear carrier and two sets of planet gears intermeshed with one another and rotatively supported by said carrier, said planet gear also in mesh with their respective ring and sun gears; a brake for each of said two reaction elements; a first clutch for connecting said first ring gear with said driven shaft; a second clutch for connecting said second ring gear with said driven shaft; a first piston for engaging said first clutch when fluid pressure is applied to said first piston, a second piston for engaging said second clutch when fluid pressure is applied to the second piston and a one-way brake connected in parallel with one of said brakes; said clutches for said ring gears and said brakes for said reaction elements being engageable in different pairs for completing four different ratio power trains from said drive shaft to said driven shaft.

8. In a transmission; a combination of a drive shaft; a driven shaft; a planetary gear set having a sun gear connected with and driven by said drive shaft, a first and second ring gear rotatively supported on said driven shaft, a second sun gear rotatively supported on said drive shaft, a first and second set of planet gears, said planet gears in mesh with each other and their respective sun and ring gears, and a planet gear carrier rotatively supporting the planet gears; a brake in each of said two reaction elements; a first clutch for connecting said first ring gear with said driven shaft and second clutch being engageable either alone or simultaneously with said first clutch; for connecting the second ring gear with said driven shaft; a first piston for engaging said first clutch when fluid pressure is applied to the first piston; a second piston for engaging said second clutch when fluid pressure is applied to the second piston; said clutches for said ring gears and said brakes for said reaction elements being engageable in different pairs for completing four different ratio power trains in forward speed from said drive shaft to said driven shaft.

References Cited in the file of this patent

UNITED STATES PATENTS

| | | |
|---|---|---|
| 2,220,174 | Ravigneaux | Nov. 5, 1940 |
| 2,555,454 | O'Leary | June 5, 1951 |
| 2,590,280 | Swift | Mar. 25, 1952 |
| 2,631,476 | Ravigneaux | Mar. 17, 1953 |

FOREIGN PATENTS

| | | |
|---|---|---|
| 1,029,951 | France | Mar. 11, 1953 |
| 146,668 | Great Britain | July 15, 1920 |